United States Patent [19]
Morrow et al.

[11] Patent Number: 5,804,078
[45] Date of Patent: *Sep. 8, 1998

[54] METHOD OF REMOVING WATER SOLUBLE ORGANICS FROM OIL PROCESS WATER

[75] Inventors: Lawrence Robert Morrow, Sugarland; Nellie R. Miranda; Wilson Kirkpatrick Martir, both of Houston; Hossein Aghazeynali, Sugarland, all of Tex.

[73] Assignee: Texaco Inc., White Plains, N.Y.

Related U.S. Application Data

[60] Provisional application No. 60/013,394 May 14, 1996.

[21] Appl. No.: 816,480
[22] Filed: Mar. 13, 1997
[51] Int. Cl.$^6$ ........................................... C02F 1/52
[52] U.S. Cl. .................. 210/708; 210/724; 210/725; 210/908; 252/358
[58] Field of Search .................. 210/639, 708, 210/724, 725, 908; 252/358

[56] References Cited

U.S. PATENT DOCUMENTS

| 3,966,594 | 6/1976 | Ohkawa et al. | 210/639 |
| 4,729,834 | 3/1988 | Itoh et al. | 210/692 |
| 4,818,410 | 4/1989 | Bellos et al. | 210/639 |
| 4,839,054 | 6/1989 | Ruebush et al. | 210/639 |
| 5,028,336 | 7/1991 | Bartels et al. | 210/629 |
| 5,354,477 | 10/1994 | Rush | 210/708 |
| 5,364,532 | 11/1994 | Bellos et al. | 210/639 |
| 5,439,592 | 8/1995 | Bellos et al. | 210/724 |

OTHER PUBLICATIONS

*The Merck Index*, Tenth Edition, p. 1231, entry 8419, "Sodium Bisulfite", Merck & Co., Inc. Rahway, New Jersey 1983.

Fang, C.S and J.H. Lin, *Air Strippng For Treatment of Produced Water*, Journal Of Petroleum Technology (May 1988) pp. 619–624.

Eriksson, Peter, *Nanofiltration Extends The Range Of Membrane Filtration*, Environmental Progess, vol. 7, No. 1 (Feb. 1988) pp. 58–62.

Mickley, Michael C., *A Charged Ultrafiltration Membrane Process For Water Softening*, IDA Journal, vol. 1, No. 1 (Mar. 1985) pp. 1–14.

Simpson, A.E., C.A. Kerr and C.A. Buckley, *The Effect Of pH on The Nanofiltration of The Carbonate System In Solution*, Desalination, vol. 64 (1987) pp. 305–319.

Bindoff, A., C.J. Davies, C.A. Kerr and C.A. Buckley, *The Nanofiltration And Reuse Of Effluent from The Caustic Extraction Stage of Wood Pulping*, Desalination, vol. 67 (Dec. 1987) pp. 455–465.

Somerville, H.J., et al., *Environmental Effect of Produced Water From North Sea Oil Operations*, Marine Pollution Bulletin, vol. 18, No. 10 (Oct. 1987) pp. 549–558.

Ikeda, K., T. Nakano, H. Ito, T. Kubota and S. Yamamoto, *New Composite Charged Reverse Osmosis Membrane*, Desalination, vol. 68 (Mar. 1988) pp. 109–119.

*Primary Examiner*—Jay H. Woo
*Assistant Examiner*—Betsey J. Morrison
*Attorney, Agent, or Firm*—Henry H. Gibson; Arnold White & Durkee

[57] ABSTRACT

An improved method of removing water soluble organics from produced water is disclosed. In the method, a chemical, selected from the group consisting of sodium bisulfite, hydroxylamine hydrochloride, tallow amine, acetic acid, and combinations thereof, is added to the water in an amount sufficient to adjust the pH of the water to about 6.0 to 6.5. Water soluble organics then separate out from the water for easy removal by conventional phase separation techniques.

13 Claims, 5 Drawing Sheets

METHOD OF REMOVING WATER SOLUBLE ORGANICS FROM OIL PROCESS WATER

RELATED PATENT APPLICATION

This application claims the benefit of prior filed copending U.S. Provisional application Ser. No. 60/013,394, filed Mar. 14, 1996, entitled SODIUM BISULFATE AND CERTAIN AMINES TO REDUCE WATER SOLUBLE ORGANICS (WSOs) IN OILFIELD PRODUCED WATER.

FIELD OF THE INVENTION

This invention is related to the removal and recovery of water soluble organics (WSO) from oil process water. In particular, the present invention relates to the removal and recovery of water soluble petroleum organics from crude oil production water. The invention is also applicable to the removal of water soluble organics from various other waters and aqueous streams that contain water soluble organics, such as for example waters used in refinery operations or other industrial applications.

BACKGROUND OF THE INVENTION

The production from oil wells typically comprises a mix of products, including gas which separates as the production fluids are received at the surface, sand particles carried along in the production stream; and a stream of oil and water, which is of interest in the present invention. When an oilfield reservoir initially begins production, the ratio of oil to water is usually very large. As the reservoir matures in production, the ratio becomes smaller. Generally, produced oil well fluids are comprised of about 20–80% or more of crude oil or hydrocarbons with the remainder water. However, the production of oilfield water may become as large as 90% of the overall liquids.

This produced water must be separated from the oil before the oil, or hydrocarbons, may be treated or processed. Thus, one of the first steps after production of the oil well fluids is to separate the oil from the water. Separation is conventionally accomplished using a bulk separator or free water knock-out system generally employing phase separation techniques. After separation, the water is usually discharged into the environment.

Certain reservoirs can produce oily components with considerable propensity for the water rather than the oil. These compounds or components are referred to as water soluble organics (WSOs). WSOs include, among other things, certain naphthenates, anion-forming compounds typified by phenols, lower fatty acids, etc. These fatty acids are typically $C_1$–$C_8$ acids such as acetic, propionic, butyric, benzoic, etc. and may typically be found in aqueous solution in salt form. The presence of these components in water can result in higher concentrations of oil in the water phase than what is normally observed.

Because of the solubility of WSOs in water, the usual oilfield phase separation type equipment is ineffective in removing them. However, environmental regulations prevent discharge of the water into the environment while the water contains WSOs. For example, produced waters found in the Gulf of Mexico may contain as much as up to about 1 wt % WSOs and the WSOs may commonly be found in amounts of 30–500 ppm as measured by the Freon Extraction Oil and Grease Test (ASTM Text method 413.2). Pollution standards which prevail in the Gulf of Mexico forbid the discharge from a production platform of recovered salt water when the organics measure in excess of 48 ppm, although occasional increases to 72 ppm may be permitted for a limited interval.

To meet present day environmental standards, a process to reduce the level of WSOs or water soluble organics in the discharged stream to 50 ppm or less is needed. Methods such as distillation or the use of biological treating compounds are known which can separate water soluble organics from water; however, they are too complex and/or expensive to be practiced.

For further background and discussion of problems generated by WSOs and some attempts to solve those problems, see the following:

i) European patent 251,691 to the Water Research Commission, Transvaal, South Africa as assignee of Buckley et al., published Jan. 7, 1988;

(ii) Simpson et al. The Effect of pH on the Nanofiltration of the Carbonate System in Solution, Desalination 64 (1987) pp 305–319;

(iii) Bindoff et al. The Nanofiltration and Reuse of Effluent from the Caustic Extraction Stage of Wood Pulping, Desalination 67 (1987) pp 455–465;

(iv) Mickley, A Charged Ultrafiltration Membrane Process for Water Softening IDA Journal 1 (1) (1985, March) pp. 1–14;

(v) Somerville et al. Environmental Effect of Produced Water from North Sea Oil Operations. Marine Pollution Bull. 18 (10) (1987) p 549–558;

(vi) C. S. Fang et al. Air Stripping for Treatment Produced Water, J. Petroleum Technology May (1968) pp 619–624;

(vii) P. Eriksson, Nanofiltration Extends the Range Membrane Filtration Environmental Progress (1988);

(viii) K. J. Keda et al. New Composite Charged Reverse Osmosis Membrane Desalination 68(1988)109–119.

Previous attempts in the field to remove water soluble organics from produced water often focused on acidification. The most common method uses a strong mineral acid like phosphoric to adjust the pH of the process water to a range of 3–5 to cause separation of the water soluble organics from the water. U.S Pat. No. 4,818,410 teaches such a method. Other methods for removing water soluble organics from produced water, often on offshore facilities, before ocean discharge, use, for example, activated charcoal, adsorbents such as ion exchange resins, and reverse osmosis. These methods can be expensive, maintenance intensive, and waste producing.

There is a distinct need in the art for an economical and effective method of removal of water soluble organics from produced water.

SUMMARY OF THE INVENTION

Although sodium bisulfite is traditionally used as an oxygen scavenger, we have discovered, surprisingly, that sodium bisulfite is useful in removing water soluble organics from produced water, such as that produced from an oil bearing subterranean formation, and from other process water, such as that found in refinery operations, and other waters from industrial applications employing water containing water soluble organics. In the method of our invention, sodium bisulfite, or a chemical comprising sodium bisulfite, is added to the water, or aqueous liquid, and the water soluble organics separate out from the water. Preferably, the sodium bisulfite is added in sufficient quantities to adjust the pH of the water or aqueous liquid to less than about 7.0 and preferably to within the range of about 6.0 to about 6.5.

We have further discovered that sodium bisulfite is also effective in this invention when combined with one or more chemicals such as hydroxylamine hydrochloride, tallow amine, or acetic acid. One or more of these three chemicals may also be used in the method of this invention in the place of sodium bisulfite.

DESCRIPTION OF THE INVENTION

Figure 1:
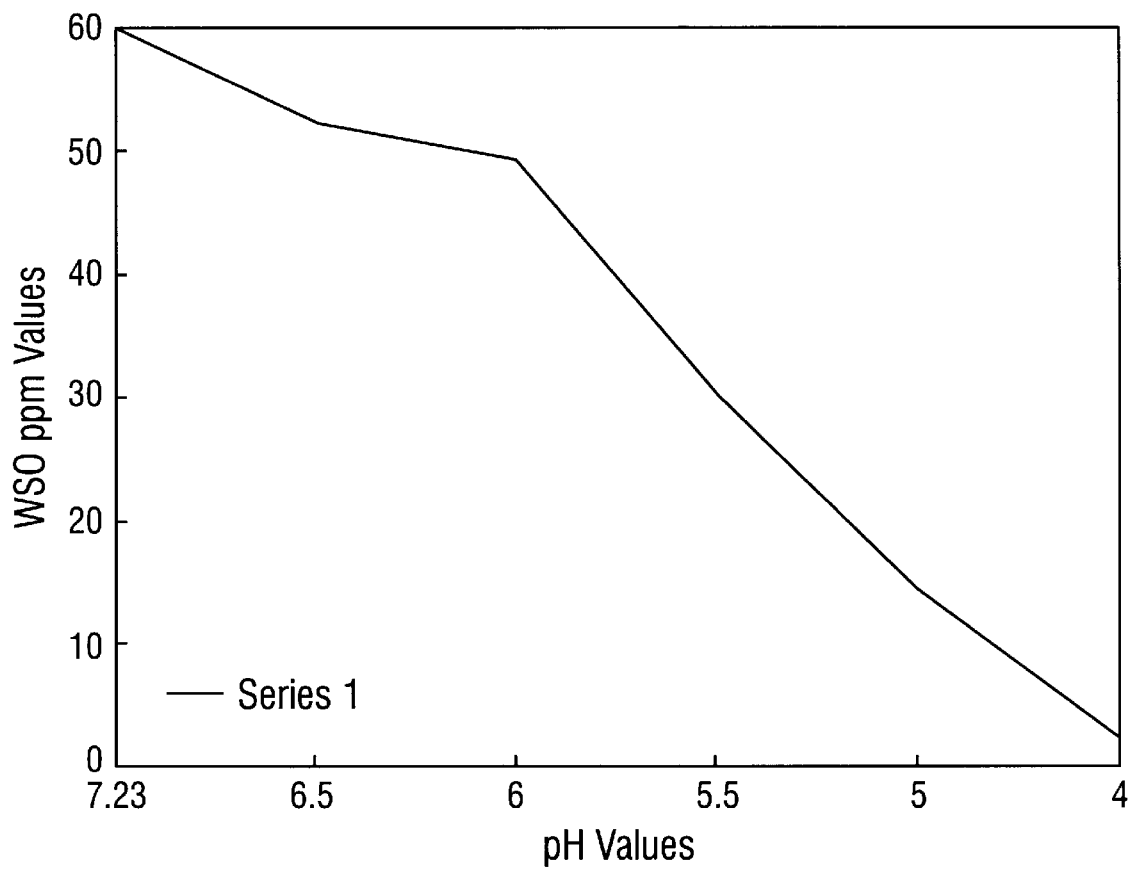
FIG. 1 is a graph showing the amount of water soluble organics in process water plotted against the pH values of the water adjusted using phosphoric acid, according to the prior art, as described in Example 1.

The waters or aqueous liquids which may be treated by the method of this invention may come from a wide variety of sources. These liquids may include various process waters containing water-soluble organics requiring treatment to recover a liquid containing at least a lower concentration of water soluble organics. For another example, the liquids may be aqueous liquids which contain immiscible hydrocarbons (including crude petroleum derived hydrocarbons or slop water as found in refinery operations) in amounts ranging from as low as parts per million up to high percentages.

The aqueous liquids which may be treated by the process of this invention include, but are not necessarily limited to, liquids commonly having a pH below 7, and typically in the range of about 4 to about 7. A pH of about 4.4 to about 6 for these liquids is the most typical or common.

In a typical off-shore well drilling operation in the oil industry, the aqueous liquid of particular interest for purposes of this invention is produced water. Produced water is water recovered with hydrocarbons from the well and includes injected water (that injected into the well to assist in displacement of the oil) and formation or connate water (that which is found in the well with the oil). Such produced water may contain, among other things, water-soluble organics (WSOs), in concentrations typically ranging from about 0.5 to about 500 milligrams per liter (mg/l).

Water soluble organics found in and recovered from petroleum are generally called "petroleum acids" or more specifically "naphthenic acids." Chemically, the petroleum acids are primarily monocarboxylic acids related to the naphthene (alicyclic) series of hydrocarbons. However, other petroleum acidic substances are included. For example, substituted phenols, mercaptans, long chain ketones, etc. may act as petroleum acids in the sense of this invention. Petroleum acids are natural components of crude oil and are not formed by refining. A typical formula of the acids may be written as $R(CH_2)_n COOH$, wherein R is a cyclic moiety comprised of 1, 2, 3 or more rings and n is usually 1 or higher. These acids include, for example, acids such as cyclopentane acetic acid and trans-2,2,6-trimethlycyclohexylacetic acid. Aromatic rings, saturated rings and fused rings are normally present. As many as 120 or more different petroleum acids may be present in a given crude oil. Most are soluble in all proportions in hydrocarbons, but have only slight solubility in water. However, the naphthenates, the sodium salts or other alkali metal salts of the petroleum acids are preferentially water soluble, and therefore of interest in the present invention. At the pH of the naturally occurring substances in the aqueous phase, these acids may exist as anions in association with counterions of sodium, calcium, etc. For example, naphthenic acids can be regarded as being present as naphthenate salts. Often, therefore, petroleum acids in the aqueous phase of oil production fluids are in anionic form and may be more properly termed as petroleum carboxylate salts, phenates and other salts.

In the present invention, certain chemical compounds and mixtures thereof can be substituted for chemical systems generally used in the art and the substitution will result in more efficient removal of water soluble organics in produced water for a reduced cost. These compounds include sodium bisulfite, tallow amine, hydroxylamine hydrochloride, acetic acid, and combinations thereof. These chemicals are often hereinafter referred to as the chemical compounds of this invention. The preferred chemical compound for use in this invention is sodium bisulfite or sodium bisulfite in combination with an amine or acetic acid.

While not wishing to be bound by theory, it is presently believed that the chemical compounds of this invention are effective in removing water soluble organics from water because of the following mechanisms:

a) Sodium bisulfite forms a hydrogen bonding complex with the water soluble organics;

b) Hydroxylamine hydrochloride also forms a hydrogen bonding complex;

c) Tallow amine forms a salt complex with the water soluble organics; and d) Acetic acid protonates the water soluble organics.

In the practice of this invention, a chemical compound of the invention is added to produced water, preferably in an amount sufficient to adjust the pH of the water to less than about 7.0 and most preferably to a pH in the range of about 6.0 to about 6.5. This range results in reduced corrosion problems and requires less chemicals for the method of this invention than is common with prior art methods.

In the field, the chemical compounds of this invention may be added into the water treatment facility, perhaps in a header system in front of the separators, skimmers or air floatation devices. When an amine is used, it may be added in front of a coalescer or flotation device. Preferably, however, this invention will be applied, at least with respect to produced water from an oilfield, after at least initial separation of the water from the crude oil by conventional means. Such crude oil does not need to be present with the water for application of this invention. However, when the water has no trace of oil, other than the water soluble organics associated with it, contacting the water with an oil, such as mineral oil, after adding a chemical compound of this invention to the water will enhance or effectuate the separation of the water soluble organics from the water.

When sodium bisulfite is used, care should preferably be taken not to oxidize the bisulfite, as may be caused, for example, by introducing oxygen into the water. Sodium bisulfate will not be as effective in the invention as sodium bisulfite.

Laboratory data indicates this invention can provide economic advantages, reducing cost for removing water soluble organics by about 22 to 87 percent when compared to typical chemical systems currently in use. The laboratory data indicates that the amount of sodium bisulfite used to displace the water soluble organics according to ASTM Test Method 413.2 ranges from 60–50% less on a per pound basis for a particular field than when using phosphoric acid. The February 1995 Chemical Marketing Reporter gives a bulk price for phosphoric acid as $0.33/pound and sodium bisulfite at $0.28/pound. Thus, this invention generally requires less chemical at lower cost, resulting in potentially great savings with use of the invention.

As discussed in the examples below the effectiveness of the various chemical compounds of this invention and the prior art methods were measured and compared for displacing water soluble organics from water by using a modified EPA 413.2 infrared procedure. In this procedure, chemical compounds of this invention, or prior art chemicals for comparison, were added to samples of produced water. The amounts of the chemical compounds added varied so as to obtain different pH levels in the samples. After this treatment, the water samples were filtered through a 0.45 micron filter to remove most of the free oil, then extracted with Freon to remove any remaining dispersed oil. This extract was called "A" extract. The "A" extract would contain any water soluble organics that were displaced into it from the produced water. The pH of the water samples was then lowered to 2, and the samples were extracted again with Freon. This extract was called "B" extract. The "B" extract would contain any water soluble organics remaining in the water phase. The Freon was then analyzed with a portable Foxboro infrared analyzer to determine the amount of water soluble organics present in each extract. For Examples 1–3 below, produced water from an offshore well in the United States, having an average amount of water soluble organics of 50–60 ppm, was used. For Example 4, produced water from a different field, having an average amount of water soluble organics of 300 ppm was used.

EXAMPLE 1

Prior Art

In Example 1, for the purpose of comparison with the present invention, phosphoric acid, the current prior art chemical most commonly used in the oil industry for removing water soluble organics from produced water, was added to produced water samples instead of a chemical compound of this invention. Applying the modified EPA 413.2 infrared procedure at a pH of 6.5, about 53 ppm water soluble organics remained in extract "B," and at pH 6.0, about 50 ppm water soluble organics remained in extract "B." Only when the pH was lowered to 5.5 with phosphoric acid was enough water soluble organics removed from the sample in extract "A" so that the water soluble organics remaining in extract "B" approached acceptable discharge limits. These test results are plotted in the graph in FIG. 1.

EXAMPLE 2

Prior Art

Figure 2:
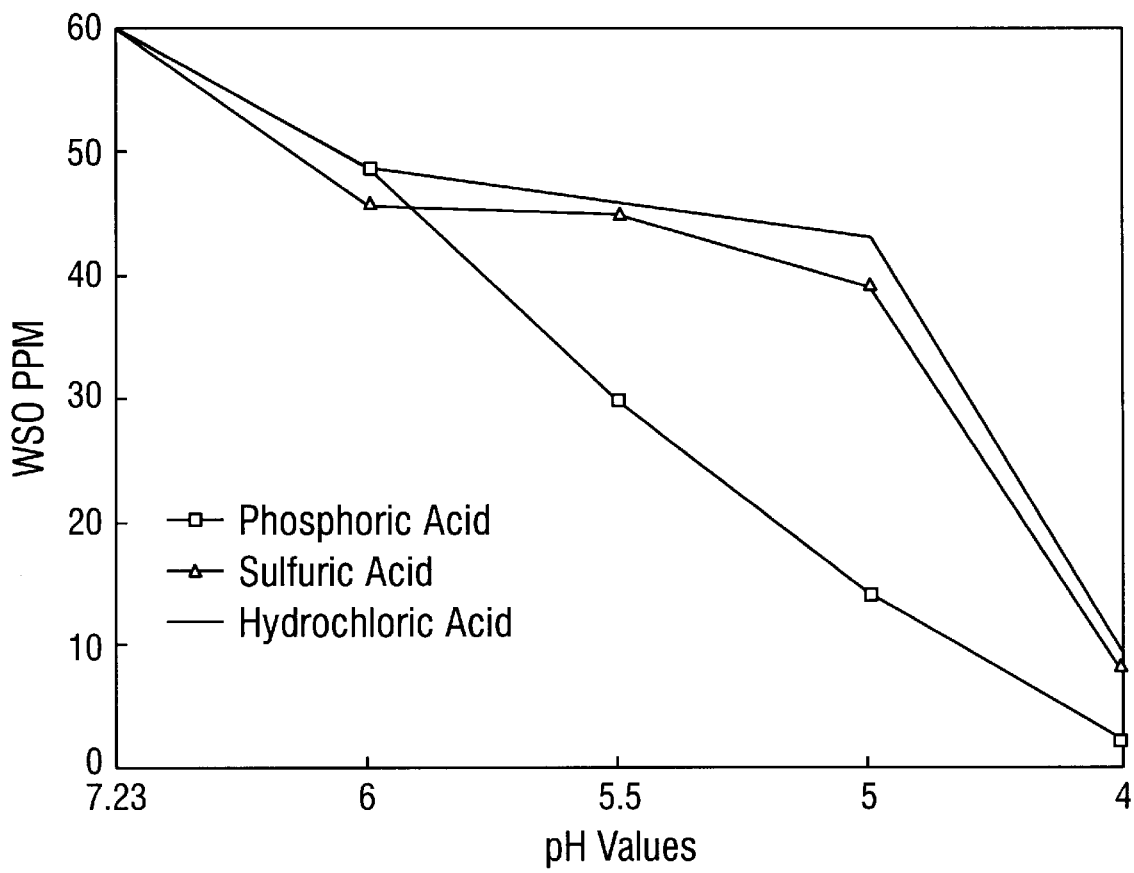
FIG. 2 is a graph showing the amount of water soluble organics in process water plotted against the pH values of the water adjusted using sulfuric acid and hydrochloric acid, according to the prior art, as described in Example 2.

In Example 2, sulfuric acid and hydrochloric acid, acids recommended in U.S. Pat. No. 4,818,410, were used to adjust the pH of produced water samples and remove water soluble organics from the samples. These two acids were less effective than the phosphoric acid used in Example 1. They required a pH of 4.0 –5.0 to remove the water soluble organics to within discharge guidelines. These test results are plotted in the graph of FIG. 2.

EXAMPLE 3

Figure 3:
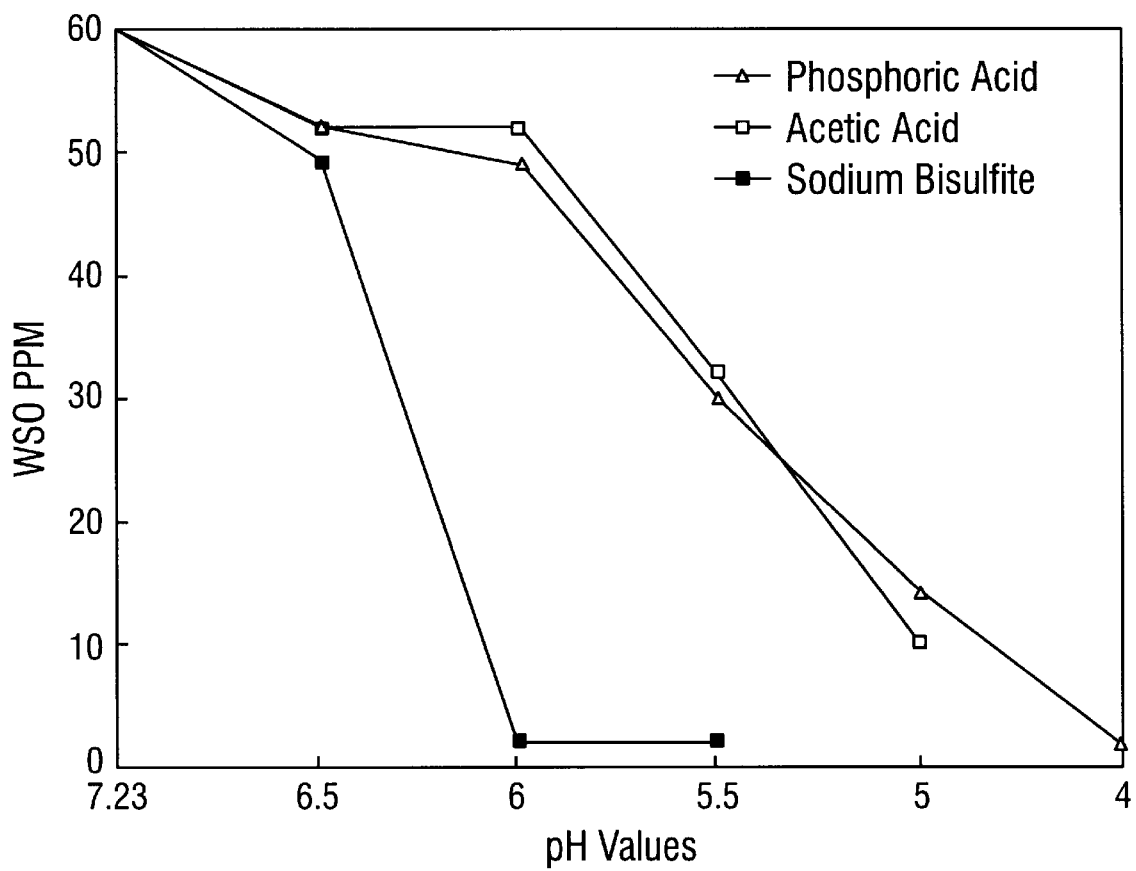
FIG. 3 is a graph comparing the amount of water soluble organics in process water plotted against the pH values of the water adjusted using sodium bisulfite, phosphoric acid and acetic acid, as described in Example 3.

In Example 3 sodium bisulfite of this invention was added to the produced water samples. At pH of 6.0, less than 5 ppm of water soluble organics remained in the water—in extract "B"—when sodium bisulfite was used. These test results are plotted in the graph of FIG. 3, along with results from use of acetic acid and phosphoric acid for comparison. These results show sodium bisulfite to be superior at removing water soluble organics.

EXAMPLE 4

Figure 4:
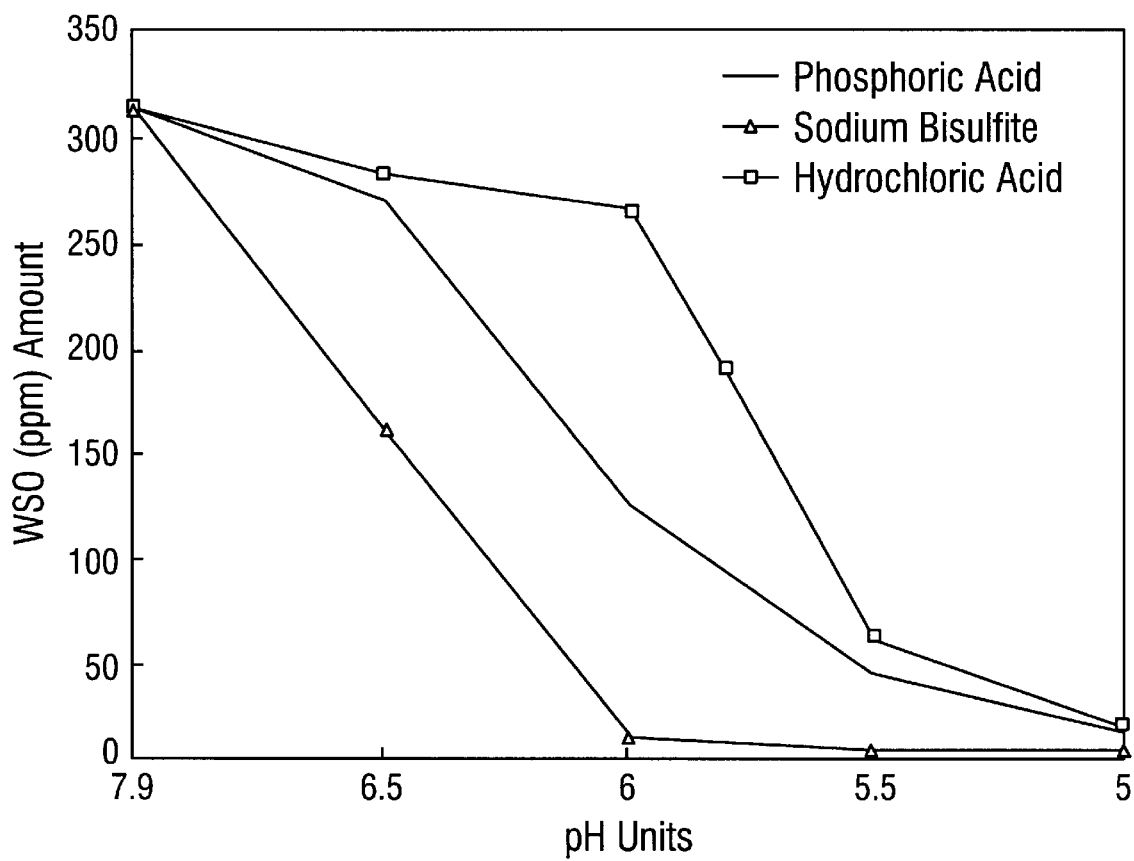
FIG. 4 is a graph comparing the utility of sodium bisulfite with the utility of phosphoric acid in separating water soluble organics from process water containing large amounts of water soluble organics, as described in Example 4.

Example 4 demonstrates the superior utility of sodium bisulfite of this invention when compared to phosphoric acid of prior art for removing water soluble organics from produced water from a field having large amounts of water soluble organics, larger than in Example 3. Using phosphoric acid, approximately 270 ppm of water soluble organics remained in the solution (and thus appeared in extract "B") at pH 6.5 and about 125 ppm of water soluble organics remained in solution (and thus in Extract "B") at pH 6.0. Using sodium bisulfite, about 155 ppm water soluble organics remained in solution at pH 6.5 and about 14 ppm water soluble organics remained in solution at pH 6.0. These test results are shown in the graph of FIG. 4. Some oxygen may have been present in these water samples, reducing the effectiveness of the sodium bisulfite by oxidizing it to sodium bisulfate. Nevertheless, the results with the invention were superior.

EXAMPLE 5

Figure 5:
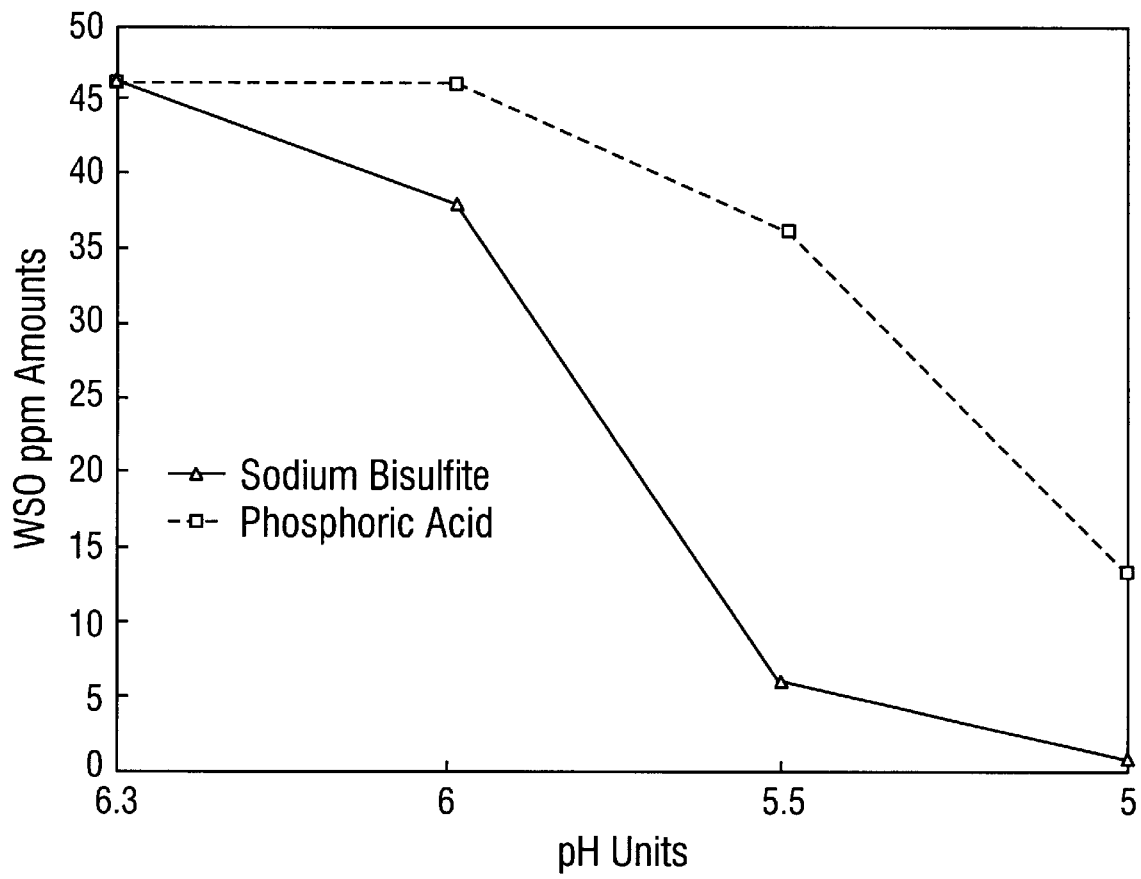
FIG. 5 is a graph comparing the utility of sodium bisulfite with the utility of phosphoric acid in separating water soluble organics from process water from a field different from that used for Example 3 or Example 4, as described in Example 5.

In Example 5, produced water samples from still another field were used. In this example, addition of enough sodium bisulfite to reduce the pH to 5.5 was needed to displace the desired amount of water soluble organics. However, sodium bisulfite was nevertheless shown to be more effective at removing the water soluble organics from the water samples than was phosphoric acid, is shown in FIG. 5.

The principle of the invention and the best mode contemplated for applying that principle have been described. It is to be understood that the foregoing is illustrative only and that other means and techniques can be employed without departing from the true scope of the invention defined in the following claims.

We claim:

1. A method for removing water soluble organics from oil process water comprising:
   adding to said water a chemical comprising
      sodium bisulfite in an amount sufficient to adjust the pH of the oil process water to a range of about 5.5 to about 6.5;
   allowing the water soluble organics to separate out from the water; and removing the separated water soluble organics from the water.

2. The method of claim 1 wherein the chemical further comprises acetic acid.

3. The method of claim 1 wherein said chemical is added in an amount sufficient to adjust the pH of the oil process water to the range of about 6.0 to about 6.5.

4. The method of claim 1 wherein such separated water has less than about 50 ppm water soluble organics remaining in it.

5. The method of claim 1 wherein said oil process water is aqueous liquid produced from an oil bearing subterranean formation.

6. The method of claim 1 wherein said aqueous liquid has undergone phase separation for initial removal of oil prior to the addition of the chemical compound.

7. The method of claim I wherein said oil process water is taken from a refinery process stream.

8. The method of claim 1 wherein said sodium bisulfite is mixed with at least one chemical selected from the grouped consisting of hydroxylamine hydrochloride, tallow amine and acetic acid.

9. A method for removing water soluble organics from water containing water soluble organics, said method comprising:

adding to said water a chemical comprising
      sodium bisulfite; in an amount sufficient to adjust the pH of the oil process water to a range of about 5.5 to 6.5
   contacting said water with oil;

allowing the water soluble organics to separate out from the water; and removing the separated water soluble organics from the water.

10. A method for removing water soluble organics from water containing water soluble organics, said method comprising:

adding to said water sodium bisulfite in an amount sufficient to adjust the pH of the oil process water to a range of about 5.5 to 6.5 allowing the water soluble organics to separate out from the water; and removing the separated water soluble organics from the water.

11. The method of claim 10, wherein the sodium bisulfite is mixed with tallow amine.

12. The method of claim 10, wherein the sodium bisulfite is mixed with hydroxylamine hydrochloride.

13. The method of claim 10, wherein the sodium bisulfite is mixed with acetic acid.

* * * * *